Figure 1:
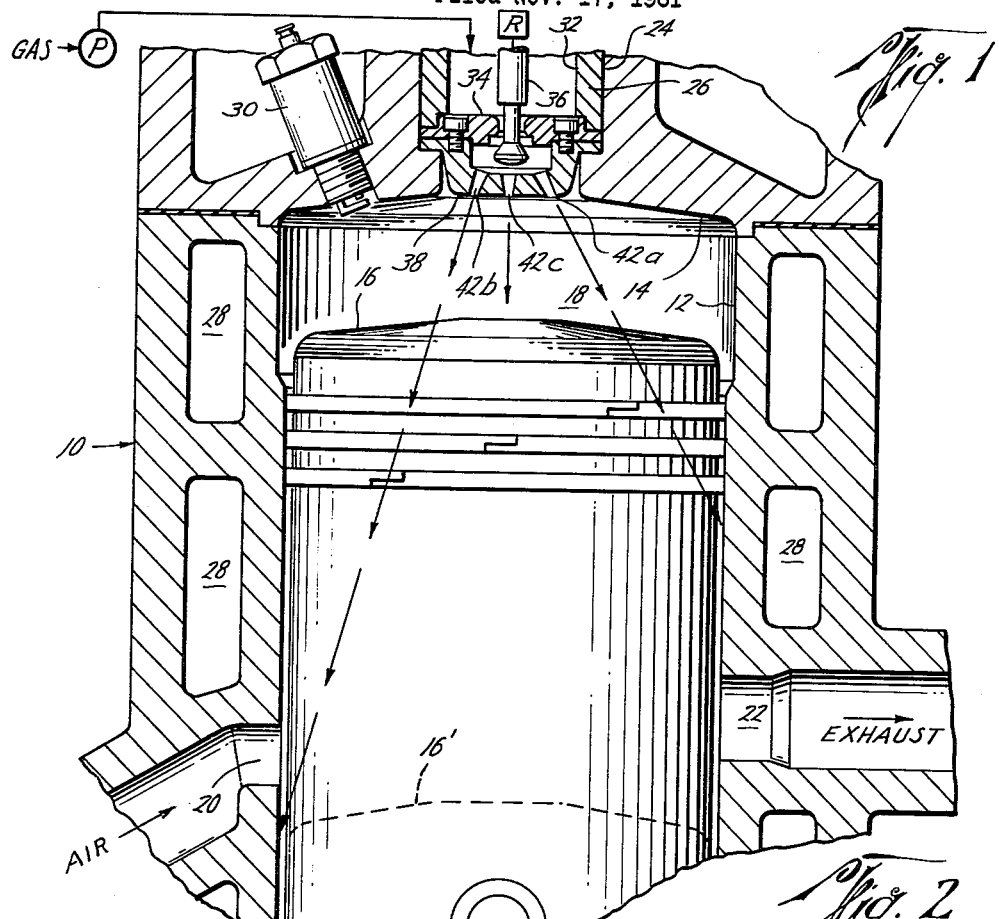

Nov. 6, 1962 K. A. RICHARDSON 3,062,198
GAS ENGINE FUEL INJECTION
Filed Nov. 17, 1961

Kenneth A. Richardson
INVENTOR.

BY James P. Weiler
Jefferson D. Giller
William A. Stout
Paul L. DeVerter II
ATTORNEYS United States Patent Office 3,062,198
Patented Nov. 6, 1962

3,062,198
GAS ENGINE FUEL INJECTION
Kenneth A. Richardson, Ponca City, Okla., assignor to Nickles Machine Corporation, Ponca City, Okla., a corporation of Oklahoma
Filed Nov. 17, 1961, Ser. No. 153,156
7 Claims. (Cl. 123—1)

The present invention relates to improvements in gas engine fuel injection, and particularly to an improved injection nozzle and the combination of an injection nozzle and valve seat with 2-cycle internal combustion engines of the natural gas type.

The gas engine fuel injection of the present invention is particularly suited for use with the very large natural gas type engines which are found in the petroleum industry and are typically used for driving integral compressors. Such engines typically have piston diameters of 10 inches or more. Since these engines are quite large, any time that they are out of service represents quite a capital loss. The usual maintenance factor which determines when these engines will have to be stopped for service is the erosion and fouling of the fuel valve seat. Generally these valve seats are replaced after 4400 hours of operation.

In the typical installation, gas engine compressors are generally run 24 hours a day until the above mentioned 4400 hours of operation have accumulated. Thus, it is readily seen that these engines may be described as continuous duty machines. It would, therefore, be very advantageous to provide apparatus which would allow these engines to remain in service for a longer period of time. Furthermore, it would be extremely advantageous to provide a means of increasing the fuel efficiency of these engines, so that they would produce the same amount of work while consuming less fuel. The present invention is directed to both of these problems.

Injection nozzles of various types have generally been utilized in the past in internal combustion engines of the diesel type. When utilized with diesel engines, the injection nozzle is utilized to atomize the liquid oil so that it becomes a fine spray of droplets of oil. The present invention does not relate to the atomization of oil or the change of state from a liquid to a gas.

In the gas engine, due to the continuous service conditions demanded for use in the field, complex injection systems have been dispensed with in favor of simpler equipment so that manual attendance upon the engine is reduced. Therefore, the typical gas engine utilizes a fuel valve very similar to that found in an automobile internal combustion engine, having a minimum of parts. In the 4-cycle gas engine, the fuel gas and the intake air are mixed before introduction to the combustion chamber, consequently injection nozzles are not necessary. In the 2-cycle gas engine, however, after combustion, the piston moves downwardly and uncovers the exhaust port, which allows part of the exhaust gases to escape. Upon further movement downwardly of the piston, the air intake port or scavenging port is opened and the remainder of the exhaust gases are expelled while a charge of new air is brought into the combustion chamber. Then, as the piston moves upwardly again the air intake port and the exhaust port are closed, and the fuel valve is opened to permit the entrance of fuel in a straight conical pattern, generally in the range of 10–25 p.s.i. Finally, the fuel and air mixture is ignited by one or more spark plugs, or in some instances by a hot plug.

The present invention proposes to alter the usual fuel injection pressures, as well as the fuel distribution pattern, and velocities, found in such 2-cycle gas engines. Thus, the present invention will provide a high pressure fuel injection, at high velocity, with an angled, swirling spray, through an improved valve and nozzle, so that the fuel is more thoroughly mixed with the air in the combustion chamber to provide a decrease in the total amount of fuel required to produce the same horsepower. Further, through the use of a smaller valve and of appropriate shielding between the valve seat and the combustion chamber, the valve life is considerably lengthened, resulting in longer uninterrupted periods of operation.

It is therefore an object of the present invention to provide improved gas engine fuel injection which will obtain the aforementioned advantages and will result in more thorough air and gas fuel mixing.

A further object is to provide gas engine fuel injection, including a nozzle and a valve, which injects the fuel at a greater velocity than the ordinary nozzle, and which will inject the fuel so that an angular swirling pattern will result, thereby providing better mixing with a resultant decrease in the total amount of fuel required to produce a given horsepower.

Another object is to provide an improved nozzle for use in gas engine fuel injection which includes a plurality of tapered ports, the majority of whose axes do not intersect the center line of the nozzle, thereby providing increased velocity and a resultant swirling spray in the combustion chamber.

A still further object is to provide a combination valve seat and improved nozzle for gas engine fuel injection which will be capable of replacing present valve seats and nozzles in existing internal combustion 2-cycle gas engines with a minimum of modification.

Yet a further object is to provide a combination valve seat and nozzle which will be capable of replacing the valve seat in 2-cycle gas engines presently having no nozzles.

Another object is to provide a combination valve seat and nozzle for gas engine fuel injection wherein the valve seat may be a separate piece specially hardened and designed for its function and capable of being replaced without replacing the entire combination.

Still another object of the present invention is to provide an injection nozzle, and a valve and valve seat in combination with the nozzle for gas engine fuel injection wherein the nozzle has a plurality of tapered ports, the axes of some intersecting the cylinder substantially halfway between the top of the exhaust ports and the piston crown when at top dead center, and the axes of the remainder intersecting substantially the juncture of the cylinder and piston when the piston is at bottom dead center, the tapered ports being radially disposed and tangentially aligned to provide a swirling spray, and including a tapered center port directed along the axis of the cylinder.

Figure 2:
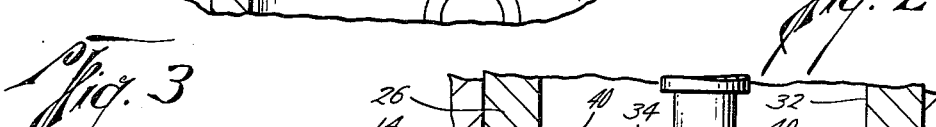
Figure 3:
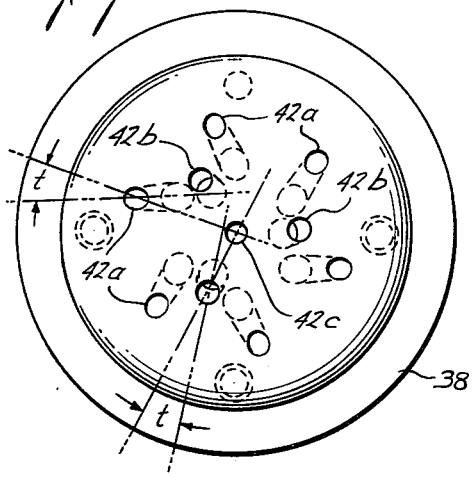

Other and further objects, features and advantages will be apparent from the following description of a presently preferred embodiment of the invention, given for the purpose of disclosure, and taken in conjunction with the accompanying drawings, where like character references designate like parts throughout the several views, and where:

FIGURE 1 is a partial cross-sectional view of a 2-cycle gas engine block showing the invention installed therein, and showing the fuel valve open, and the piston at substantially top dead center, FIGURE 2 is a cross-sectional view of the injection nozzle, valve seat, and valve of the present invention greatly enlarged from that shown in FIGURE 1, and showing the valve when closed, and FIGURE 3 is a bottom view of the nozzle.

Generally, the invention is directed to improved gas engine fuel injection, and includes an improved injection nozzle with a plurality of tapered ports so situated as to produce a high velocity, angular, divergent, swirling effect on the injected fuel gas and a combination valve seat and injection nozzle.

Referring now to the drawings, and particularly to FIGURE 1, the reference numeral 10 generally designates a typical 2-cycle gas engine, having a cylinder 12, a cylinder head 14, a piston 16, and a combustion chamber 18. Mounted in the cylinder wall is a conventional air intake port 20 (also known as a scavenging air port) and an exhaust port 22. Mounted centrally in the cylinder head 14 is a well 24 in which the valve assembly 26 is placed. Surrounding the cylinder 12 are various passageways 28 which are used to cool the engine. Mounted in the combustion chamber 18 is a means for igniting the air fuel mixture, such as the spark plug 30 shown in the cylinder head 14.

When in operation, the piston 16 reciprocates within the cylinder 12 of the 2-cycle gas engine 10. The position of the piston 16 when in its bottom dead center position is shown in dotted lines as the piston 16'. Suitably mounted on the engine is a pump P which is utilized to supply the fuel gas to the valve assembly 26. Also, suitably attached to the valve assembly 26 is a means for operating the valve, such as the rocker arm assembly R. As all of the foregoing are conventional, no further explanation is deemed necessary or appropriate. However, a brief summary of the operation of a 2-cycle gas engine is now given.

In a 2-cycle engine the air-gas mixture is compressed as the piston 16 moves to its top dead center position. Thereupon, by an appropriate means such as the spark plug 30, the air gas mixture is ignited within the combustion chamber 18 driving the piston 16 downwardly. As the piston 16 moves downwardly within the cylinder 12, the exhaust port 22 is uncovered allowing the spent exhaust gases to escape therethrough. Further downward movement of the piston 16 then allows the air intake port 20 to open whereby a new charge of air is forced into the combustion chamber 18 to provide new air for the next ignition as well as to remove some of the remaining exhaust gases. Then as the piston 16' moves upwardly from its bottom dead position and closes both the air intake port 20 and the exhaust port 22, the gas valve 36 is opened injecting fuel into the combustion chamber in preparation for the next ignition. The present invention is particularly directed to the manner in which the gas is injected into the combustion chamber 18.

Inserted into the well 24 of the cylinder head 14 is the valve assembly 26 which generally includes the fuel valve cage 32, the valve seat 34, the valve 36, and the nozzle 38. As best seen in FIGURE 2, any conventional means, such as the screws 40, may be utilized to hold the valve seat 34 and the nozzle 38 together.

In accordance with the present invention, the valve 36 is operated by the rocker arm R so as to open and close at appropriate times with respect to the valve seat 34. Since the valve seat 34 is demountably detached, as by the screws 40, to the nozzle 38, it may be readily removed therefrom for replacement when necessary, and it may be made of a much tougher material than the nozzle 38 to withstand the beating effect of the valve 36 opening and closing. Furthermore, since the pump P supplies the gas to the valve 36 at much higher pressures than heretofore used, namely in the range 40-80 p.s.i., the size of the valve may be substantially reduced. As will hereinafter be discussed, the actual area of opening between the valve 36 and the valve seat 34 when the gas is being injected into the combustion chamber 18 may be calculated with a substantial degree of particularity.

The nozzle 38 is a generally cup-shaped device which includes a plurality of ports. When these ports are referred to generally, they will be referred to as ports 42, however, as is seen by referring to FIGURES 2 and 3, the ports 42 are aimed in various directions in a manner to be hereinafter described. The ports 42 are tapered so that the diameters of the ports 42 on the outlet or combustion chamber 18 side of the nozzle 38 are smaller than the inlet diameters of these ports 42. The purpose of this taper in the ports 42 is to increase the velocity of the gas as it enters the combustion chamber 18 from the valve assembly 26, and further, to allow the gas to expand in the combustion chamber 18. It has been found that the angle of taper may be from 4-10 degrees, with 6 degrees being presently preferred.

In utilizing the gas engine fuel injection of the present invention, it has been found that the outlet diameter or area of the ports 42 is extremely important to obtain a marked increase in efficiency. Utilizing the following empirical formula developed by the applicant, the outlet areas of each of the ports 42 may be determined:

$$A = \frac{\pi R^2 L N}{C}$$

Where

A is the outlet area of each port 42 in the nozzle 38 in square inches.
R is the radius of the power piston 16 in inches.
L is the length of the stroke traveled by the piston 16 within the cylinder 12 in inches.
C is a constant which has been derived by experiment and is substantially 14,000.
N is the number of ports 42 utilized in the nozzle 38, and is a function of the cross-sectional area of the piston 16, and is chosen so as to provide adequate coverage of the gas within the combustion chamber 18. Generally, the number of ports 42 for a 14-inch piston 16 is 10.

From the foregoing formula it is seen that the areas of the ports 42 on the outlet or combustion chamber 18 side of the nozzle 38 may be readily determined. However, to utilize this formula successfully in the design of an improved injection nozzle as taught by the present invention, it is important that the pump P supply the gas to the valve 36 at a pressure within the range of 40-80 p.s.i. It is presently preferred that the gas pressure be 67 p.s.i.

Referring now to FIGURE 3, it is seen that the axes of the series of ports 42A and the series of ports 42B do not intersect the central axis of the nozzle 38. Further, the ports 42A and 42B are tilted in the same direction with respect to the axis of the center port 42C and may be described as tangentially disposed with respect to the center axis of the nozzle 38. The angle $t$ seen in FIGURE 3 is determined by the intersection of the center line of the ports 42A or 42B with a line through the center of port 42C and the center of the outlet side of the ports 42A or 42B. This angle $t$ is the degree of tangential disposition and in most cases is between 15° and 45°, depending upon nozzle 38 size and piston displacement. The presently preferred angle $t$ is 30°. The effect of this tangential disposition of the ports 42A and 42B is to impart a swirling spray or pattern to the gas when injected into the combustion chamber 18.

With reference now to FIGURE 2, it is seen that the ports 42A and 42B are angularly disposed with respect to the center line 4—4 of the central port 42C. The result of this angular disposition is to provide a divergent spray of the gas as it leaves the nozzle 38 and is injected into the combustion chamber 18.

The particular disposition of the various ports 42 may be seen with reference now to FIGURE 1. The series of ports 42A are directed so that their axes intersect the cylinder 12 wall substantially half-way between the top of the exhaust port 22 and the piston 16 crown when at top dead center. As can be seen in FIGURE 3, the ports 42A are disposed about the nozzle 38 so that the axes of the ports 42A intersect the cylinder 12 about its circumference. The axes of the series of ports 42B are so disposed that when extended they intersect substantially the intersection of the periphery of the cylinder 12 and the piston 16 crown when the piston 16 is at its bottom dead position (shown as 16' in FIGURE 1). The result of this placement of the ports 42 is an angular swirling spray in the combustion chamber 18 which produces an air-gas pattern more completely utilized than heretofore.

It should be noted that there are twice as many ports 42A as ports 42B. Although this ratio is not critical, it is important that a substantial portion of the gas be directed to the upper part of the combustion chamber 18.

Through a series of exhaustive tests, it has been determined that the ports 42A and 42B must be located substantially as described. The mere placement of various tapered ports in a nozzle, without regard to the particular pattern being created, does not result in the increase in fuel efficiency provided by the present invention. The central port 42C is directed substantially along the axis of the cylinder 12.

In operation, the valve 36 is operated by the rocker arm R so as to produce an open area between the valve 36 and the valve seat 34. Conventionally, the valve 36 is opened when the piston 16 is approximately 33° past bottom dead center. In any event, the valve 36 is not opened until the piston 16 has effectively closed the air intake port 20 and the exhaust port 22 with respect to the injected gas. The area between the valve 36 and the valve seat 34 when the valve 36 is opened, although not extremely critical, is quite important. The applicant has found through experiment that this open area should be very similar to the sum of the outlet diameter areas of the ports 42. Since this area is considerably smaller than that typically used in gas engines, the valve 36 may be physically smaller.

Due to the heavy construction of the nozzle 38, the intense heat generated in the combustion chamber 18 upon the ignition of the gas and air mixture, is shielded from the valve seat 34. The cup-shaped nozzle 38 tends to protect the valve 36 and valve seat 34 which in turn provides longer life for these parts. Further the nozzle 38 acts somewhat as a heat sink and its presence warms the gas passing through the ports 42 prior to combustion in the combustion chamber 18. Thus, in passing through the ports 42, the gas acquires more heat energy, as well as increased velocity due to the tapering of the ports 42.

As the high velocity gas is sprayed into the combustion chamber 18, it acquires an angular swirling motion. The swirling, as previously mentioned, is due to the off-center ports 42A and 42B which in combination with the cylinder 12 make the fuel revolve around within the combustion chamber 18 in a circular pattern. The angular swirling is due to the downward divergence of the ports 42 while aimed in the directions previously mentioned. The resultant angular swirling insures more complete and thorough mixing of the gas with the air in the combustion chamber 18, thereby reducing the amount of gas which is ejected unburnt from the engine, more thoroughly mixing the gas with the air in the combustion chamber, and thus allowing less gas to do a more efficient job than heretofore while in the combustion chamber 18.

Tests made on fuel consumption using the present invention indicate that a considerable fuel saving is obtained. With injection nozzles designed in accordance with the present invention installed in a 2-cycle gas engine having a 17-inch stroke and 17-inch diameter piston it was found that the fuel consumtion was 9685 B.t.u. per brake horsepower hour. With the same engine utilizing the conventional valve and seat supplied as standard equipment therefor, the fuel consumption was 10,500 B.t.u. per brake horsepower hour. Thus the fuel savings achieved as a result of using the present invention amounted to 8.7%. During these tests, it was also noted that the mechanical vibration on the unit was less when using the invention. Further, indicator cards were taken and the results showed that with the present invention a greater consistency in the firing pattern was obtained, resulting in less mechanical vibration.

A similar group of tests have been performed on a somewhat smaller 2-cycle gas engine with integral compressor. These tests were performed on a 14-inch stroke by 14-inch piston diameter, 6-cylinder gas engine. With conventional valves and valve seats, this engine consumed 9,300 B.t.u. per brake horsepower hour when adjusted for maximum efficiency. After the installation of the gas engine fuel injection invention herein described, the fuel consumption dropped to 8813 B.t.u. per brake horsepower hour, a fuel saving of 5.24%. While providing this remarkable increase in fuel efficiency, it was also noted that the thermal efficiency of the engine increased and the percentage of methane in the exhaust gases decreased, thus indicating that the fuel gas was more thoroughly consumed and more usefully utilized in driving the load, instead of being exhausted as unspent fuel or being converted to useless heat.

As previously mentioned, the normal maximum conventional valve and valve seat life is somewhat less than 4400 hours. Utilizing the gas engine fuel injection invention herein described, this 14 x 14 2-cycle gas engine has been continuously operated for over 6300 hours, resulting in an increase in valve life of better than 44%. Thus it is seen that the present invention has not only provided an increase in fuel efficiency, but also a tremendous increase in the permissible continuous operating time of the engine, thus attaining the advantages and objects previously set out as well as others inherent therein.

This application is a continuation-in-part of my prior application entitled "Injection Nozzle," Serial No. 44,134, filed July 200, 1960, now abandoned.

Although the invention has been described with a certain degree of particularity, it is understood that the present disclosure has been made only by way of example and that numerous changes in the details of construction and the combination, shape, size and arrangement of parts may be resorted to without departing from the spirit and scope of the invention as hereinafter claimed.

What is claimed is:

1. In a gas engine fuel injection nozzle for use in connection with a combustion chamber formed by a cylinder and a piston in a 2-cycle gas engine having fuel gas supplied at from about 40 to about 80 p.s.i., said engine having at least one exhaust port in the cylinder,
    a nozzle disposed adjacent the combustion chamber, said nozzle having a plurality of ports,
    said ports tapered to a smaller diameter adjacent the combustion chamber, said ports diverging outwardly,
    the axes of at least half of said ports intersecting the periphery of the cylinder substantially half-way between the top of the exhaust port and the piston crown when at top dead center, the axes of the remainder of said ports intersecting the periphery of the cylinder at substantially the intersection of the cylinder and the piston when the piston is at substantially bottom dead center, the axes of all of said ports radially disposed from and tangentially angled with respect to the central axis of said nozzle, thereby providing an angular diverging swirling high velocity spray,
    and a tapered center port in said nozzle directed along the axis of said cylinder.

2. The invention of claim 1 including said nozzle being cup-shaped, a valve seat disposed over said cup-shaped nozzle, a fuel valve operably connected to the valve seat, and means for opening and closing said fuel valve, the area through which fuel is passed when said valve is opened being substantially equal to the sum of the outlet areas of the ports.

3. In an injection nozzle for use in the cylinder of a 2-cycle gas piston engine wherein the fuel gas is supplied at from about 40 to about 80 p.s.i., said engine having at least one cylinder, piston, exhaust port and air intake port,
    a cup-shaped nozzle having a series of ports, said ports being tapered to an outlet diameter adjacent the cylinder smaller than the inlet diameter, the outlet diameter of each port having an area determined by the following formula:

$$A = \frac{\pi R^2 L N}{C}$$

where A is equal the area of each port in square inches, R is equal radius of the piston in inches, and L is equal the stroke of the piston in inches, N is equal number of ports used in the nozzle, and C is a constant having a value of approximately 14,000, one of said ports being a center port along the central axis of the cylinder, and the remainder of said ports diverging, the diverging ports arranged in a first and a second series, the axes of the first series ports distributed about and intersecting the intersection of the cylinder wall and the top of the piston when the piston is at substantially bottom dead center, the axes of the second series ports distributed about and intersecting the cylinder wall at substantially half-way between the top of the exhaust port and the piston crown when at top dead center, the axes of the diverging ports spaced from and set at an angle in the same direction with respect to the axis of the cylinder within the range of 15–45 degrees, thereby providing a swirling, angular, divergent spray at high velocity.

4. The combination with the nozzle of claim 3 of a fuel valve operably connected to a valve seat, said seat disposed adjacent said nozzle, means for opening and closing said fuel valve, the area through which fuel is passed when said valve is opened being substantially equal to the sum of the outlet areas of said ports.

5. The improvement in 2-cycle gas engine fuel injection comprising at least one cylinder, a piston reciprocally mounted in and defining a combustion chamber in said cylinder, an exhaust port operated by said piston disposed in said cylinder, an air intake port operated by said piston in said cylinder, a fuel valve and valve seat adjacent the combustion chamber formed by said cylinder and piston, means for operating said valve, means for supplying fuel to said piston at 40–80 p.s.i., and a cup-shaped nozzle mounted in said cylinder between said valve and combustion chamber, said nozzle having a series of ports, said ports being tapered to an outlet diameter adjacent the combustion chamber smaller than the inlet diameter, the diameter of each port having an area determined by the formula:

$$A = \frac{\pi R^2 L N}{C}$$

where A is equal the area of each port in square inches, R is equal radius of the piston in inches, and L is equal the stroke of the piston in inches, N is equal number of ports used in the nozzle, and C is a constant having a value of approximately 14,000, one of said ports being a center port whose axis is along the central axis of the cylinder, and the remainder of said ports diverging outwardly from the central axis of the cylinder, the diverging ports arranged in a first and a second series radially disposed about said central port, the axes of the first series ports distributed about and intersecting the intersection of the cylinder wall and the top of the piston when the piston is at substantially bottom dead center, the axes of the second series ports distributed about and intersecting the cylinder wall at substantially half-way between the top of the exhaust port and the piston crown when at top dead center, the axes of the diverging ports spaced from and set at an angle in the same direction with respect to the axis of the cylinder within the range of 15–45 degrees, thereby providing a swirling, angular, divergent spray at high velocity.

6. The invention of claim 5 wherein said ports are tapered within the range of 4–10 degrees.

7. The invention of claim 5 wherein said valve seat is demountably attached to said cup-shaped nozzle and wherein the valve opens and closes with respect to said valve seat within the area defined by said cup-shaped nozzle and valve seat.

No references cited.